(12) United States Patent
Kim et al.

(10) Patent No.: US 7,547,057 B2
(45) Date of Patent: Jun. 16, 2009

(54) LOADING BASE ARRANGEMENT

(75) Inventors: Clarence Kim, Wiesbaden (DE); Boris Jacob, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/041,166

(22) Filed: Mar. 3, 2008

(65) Prior Publication Data

US 2008/0216718 A1   Sep. 11, 2008

(30) Foreign Application Priority Data

Mar. 5, 2007   (DE) ................ 10 2007 010 927

(51) Int. Cl.
*B60N 2/02* (2006.01)
(52) U.S. Cl. .................................. 296/65.01
(58) Field of Classification Search ............. 296/65.01, 296/66, 65.05, 65.09, 65.16, 65.17
See application file for complete search history.

(56) References Cited

U.S. PATENT DOCUMENTS

| 2,254,193 | A | * | 8/1941 | Augustine | 296/63 |
| 2,997,335 | A | * | 8/1961 | May | 296/66 |
| 4,699,418 | A | * | 10/1987 | Plavetich | 296/65.09 |
| 6,129,403 | A | * | 10/2000 | Townsend | 296/65.01 |
| 6,536,843 | B1 | * | 3/2003 | Severinski et al. | 297/378.12 |
| 7,044,550 | B2 | * | 5/2006 | Kim | 297/283.3 |
| 7,159,922 | B2 | * | 1/2007 | Iyoda et al. | 296/66 |
| 7,216,916 | B2 | * | 5/2007 | Czerwinski et al. | 296/66 |
| 2002/0043815 | A1 | * | 4/2002 | de Campos et al. | 296/66 |

FOREIGN PATENT DOCUMENTS

DE     10317537     11/2004

* cited by examiner

*Primary Examiner*—H Gutman
(74) *Attorney, Agent, or Firm*—Ingrassia Fisher & Lorenz, P.C.

(57) ABSTRACT

A loading base arrangement for a motor vehicle has a rear seat with a back rest and a seat cushion. Furthermore, there is provided a base element which can be moved in the direction of travel of the motor vehicle and on which items can be deposited. The base element is connected to the back rest and, when the base element is extended, covers the seat cushion. As a result, it is possible, when necessary, to improve the loading space for transporting bulky items.

15 Claims, 3 Drawing Sheets

LOADING BASE ARRANGEMENT

CROSS-REFERENCE TO RELATED APPLICATION

This application claims priority to German Patent Application No. 102007010927.1, filed Mar. 5, 2007, which is incorporated herein by reference in its entirety.

TECHNICAL FIELD

The invention relates to a loading base arrangement for a motor vehicle, with the aid of which the loading space of a motor vehicle can be changed.

BACKGROUND

A loading base arrangement for a motor vehicle is known from DE 103 17 537 A1, in which a rear seat is provided which has a back rest and a seat cushion. To increase the loading space of the motor vehicle, the back rest can be folded down onto the seat cushion so that a base element which can be moved in the direction of travel and onto which items can be deposited can be extended over the folded-down rear seat.

A drawback in a loading base arrangement of this type is that the folded-down rear seat requires a comparatively large amount of space in the vertical direction so the loading volume is severely limited with respect to height. In particular, if the rear seat is ergonomically formed, for example to improve comfort, a loading base arrangement of this type is unfavourable as the space available when the rear seat is folded down is particularly severely impaired thereby.

In view of the foregoing, at lest one object of the invention is to provide a loading base arrangement for a motor vehicle which, in particular in the case of ergonomically formed rear seats, allows an improved loading space, if necessary, to transport bulky items. Other described objects, features and characteristics will become apparent from the subsequent detailed description, summary, and appended claims, taken in conjunction with the accompanying drawings, and the foregoing technical field and background.

SUMMARY

The object is achieved according to an embodiment of the invention in which the base arrangement for a motor vehicle has a rear seat which has a back rest and a cushion. Furthermore, a base element which can be moved in the direction of travel is provided, on which items can be deposited. According to an embodiment, the base element is connected to the back rest so that the back rest can be moved together with the base element. When the base element is extended, the seat cushion of the rear seat is at least partially covered by the base element.

Since the back rest is connected to the movable base element, it is merely necessary for the base element to cover the seat cushion. It is not necessary for the base element to also cover the back rest. The loading space is thus increased in the vertical direction. Furthermore, the rear seat may be ergonomically formed in particular in the region of the back rest in that the back rest is shell-shaped, for example. Configurations of this type of the back rest do not lead to the loading space having to be restricted in the vertical direction.

In a preferred embodiment, the back rest is connected to the loading base so as to movable transversely to the direction of travel. The loading base can thus be variably adapted with regard to form and configuration to the items to be transported. It is possible, for example, to push the back rests of two rear seats arranged next to one another together in the centre of the motor vehicle so the loading space in the direction of travel is limited, on the one hand, by the front seats and, in the central region, by the back rests of the rear seats. This avoids an item to be transported unintentionally being able to get through into the front region of the motor vehicle between the two front seats. On the other hand, it is possible in each case to push the back rests to the outside, so a particularly long item may be arranged between the two front seats. Furthermore, it is structurally possible to provide that the two rear seats are arranged closer to one another in comparison to the front seats, so the driving comfort is particularly comfortable for passengers sitting on the rear seats. At the same time, if the rear seats are not required and instead additional loading space is required, it is possible to push the back rests against the front seats and set them up transversely to the direction of travel against the respective front seat. In particular in the case of shell-shaped ergonomic back rests, it is possible for the back rest to partially embrace the front seat back rest so a particularly space-saving and simultaneously safe positioning of the back rest can take place.

In a preferred embodiment, the loading base has a laterally extendable supplementary base. The supplementary base may, in particular, be completely inserted into the loading base. This makes it possible when the loading base is extended to consider width changes of the motor vehicle due to the construction and to provide an additional loading area. For this purpose, the supplementary base may in particular be length-adjustable, in particular may be telescopic. The supplementary base may be length-adjustable in the direction of travel and/or transversely to the direction of travel. In particular, if the supplementary base can be supported on parts of the body, for example a wheel housing, an unintentional movement of the loading base is prevented. The danger of the loaded items sliding is reduced as a result.

The back rest in the maximally extended state can preferably at least contact the front seat and particularly preferably abut against an area of the front seat. The space requirement for the back rest not currently required can thereby be reduced.

In the maximally extended state, the seat cushion is in particular covered completely by the loading base element. This ensures that the seat cushion is not damaged during transportation of the items. Furthermore, a substantially level loading area is provided.

In a preferred embodiment, an additional base is provided which, together with the at least partially extending loading base forms a substantially level loading area. For this purpose, the additional base is, in particular, height-adjustable and may be connected to the vehicle body. Particularly preferably, the additional base is length- adjustable in the direction of travel, for example in that the additional base can be telescopic. As a result, regardless of the position of the loading base, a substantially level loading area can be provided. Additionally or as an alternative, the loading base may be length-adjustable in the direction of travel, in particular may be telescopic.

Particularly preferably, the loading base and/or the back rest can be move relative to the loading base with the aid of an actuating device. The movement may take place here hydraulically, pneumatically or electrically, for example. The actuating device may be operated, in particular by a control apparatus, the control apparatus preferably being arranged in the front region of the motor vehicle so the driver and/or the front passenger can actuate the actuating device.

In particular, the loading base may be locked in the retracted state with the aid of a locking device. This avoids an unintentional movement of the loading base and of the back rest connected to the loading base. The back rest may be detachably connected to the seat cushion so that in addition or as an alternative to the locking device of the loading base, the back rest or the loading base can be fixed. Furthermore, it is possible for the angle position of the back rest to be adjusted relative to the loading base. Although the back rest is substantially only connected to the loading base and substantially not connected to the seat cushion, the rear seat behaves like a conventional rear seat. In other words, the back rest can be adapted to the requirements of a user, as necessary.

The embodiments also relate to a motor vehicle which has a first loading base arrangement and a second loading base arrangement which, as described above, can each be developed and refined. The first loading base arrangement is provided for the driver's side, while the second loading base arrangement is provided for the front passenger's side. The motor vehicle thus has two loading base arrangements arranged next to one another. As a result, it is possible to increase the loading space substantially over the entire width of the motor vehicle if necessary. The first loading base arrangement and the second loading base arrangement are preferably in a mirror-inverted configuration with respect to one another. The outlay for construction and production is thereby reduced. Furthermore, the loading base arrangement is thus better adapted to the body design of the motor vehicle.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
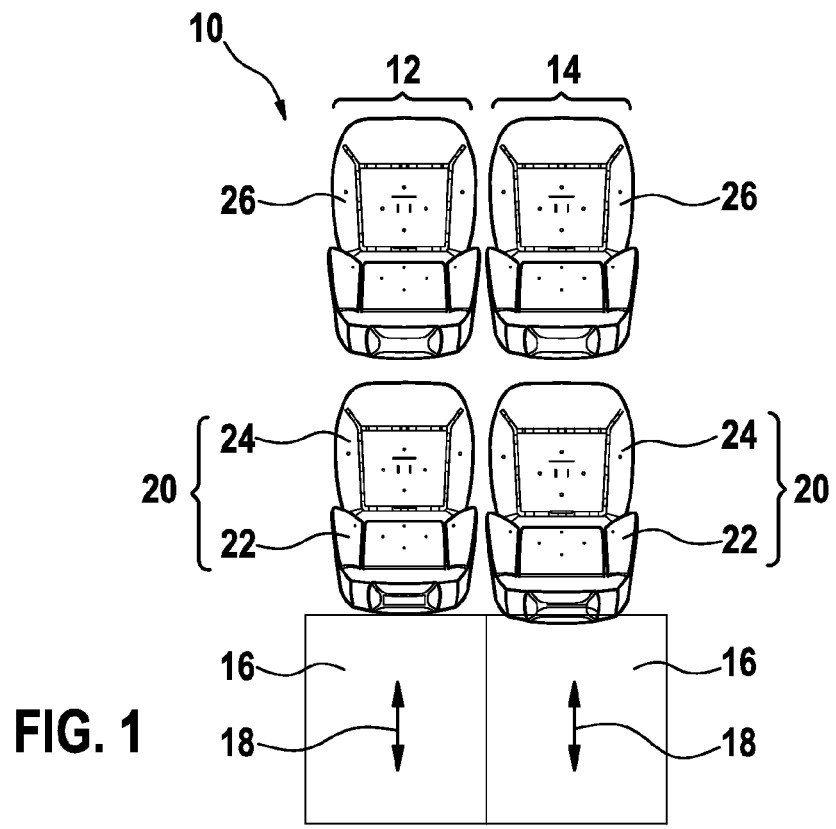
FIG. 1 shows a schematic plan view of a motor vehicle interior with loading base arrangements according to the invention.

A first loading base arrangement 12 and a second loading base arrangement 14 are provided in the motor vehicle interior 10 shown in FIG. 1. The first loading base arrangement 12 is associated with the driver's side, while the second loading base arrangement 14 is associated with the front passenger's side. The loading base arrangements 12, 14 in each case have a base element 16 which can be moved in the direction of travel and which can be displaced in the direction of an arrow 18. A rear seat 20 which has a back rest 22 and a seat cushion 24 is arranged in each case in front of the base element 16.

Figure 2:
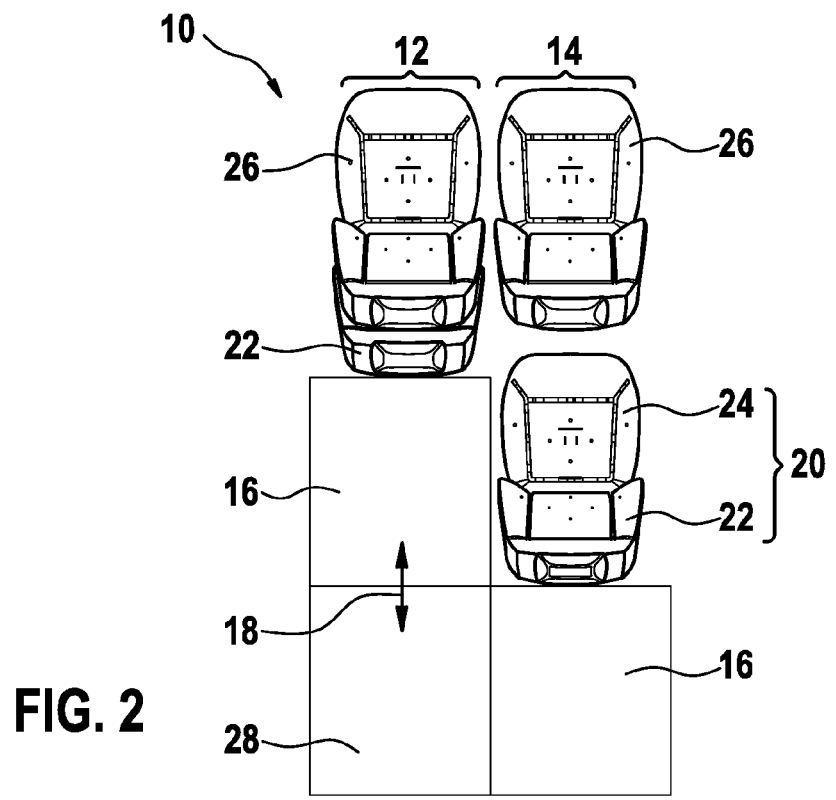
FIG. 2 shows a schematic plan view of the motor vehicle interior from FIG. 1 in an extended state of one of the loading base arrangements.

The back rest 22 is connected to the base element 16 so that the back rest 22 is displaced together with the base element 16 if the base element 16 is moved in the direction of the arrow 18. In the maximally extended state of the loading base arrangement 12 shown in FIG. 2, the base element 16 is extended to such an extent that the back rest 22 rests on a front seat 26. An additional base 28, which appears when the base element 16 is extended, and is in particular height-adjustable and/or length-adjustable, is provided below the base element 16.

Figure 3:
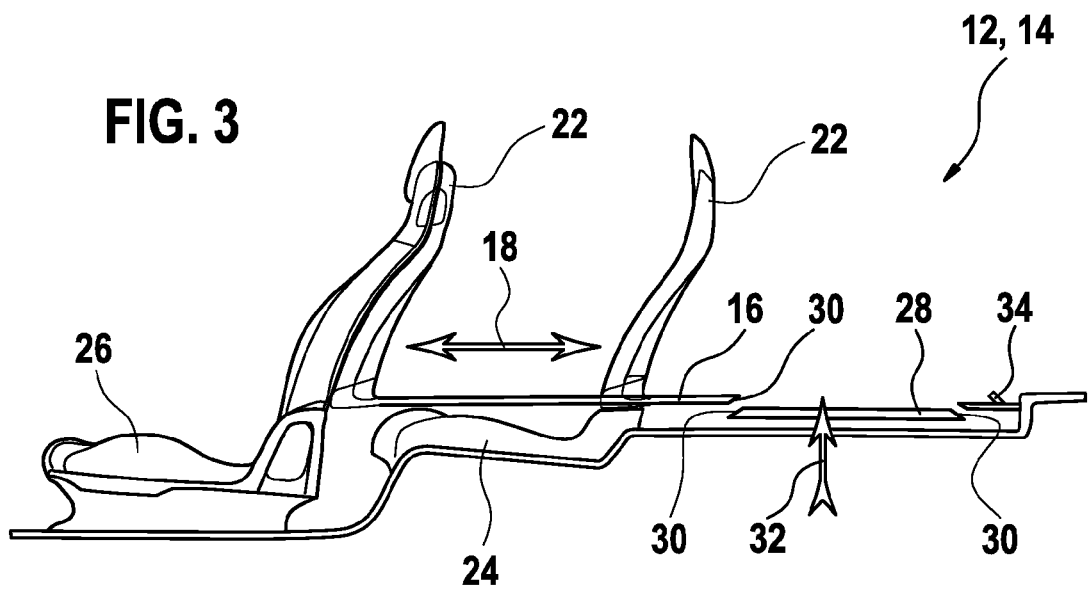
FIG. 3 shows a schematic side view of a loading base arrangement according to the invention.

When the loading base 16 is extended, the seat cushion 24 of the rear seat 20 is covered by the loading base 16 (FIG. 3). The loading base 16 and the additional base 28 may, in particular, have slanting side regions 30, so the additional base 28 can automatically move the loading base 16 into the maximally extended state if the additional base 28 is moved upwardly in the direction of the arrow 32. Furthermore, a locking device 34 may be provided, with the aid of which the loading base 16 and/or the additional base 28 can be locked in the retracted and/or extended state.

Figure 4:
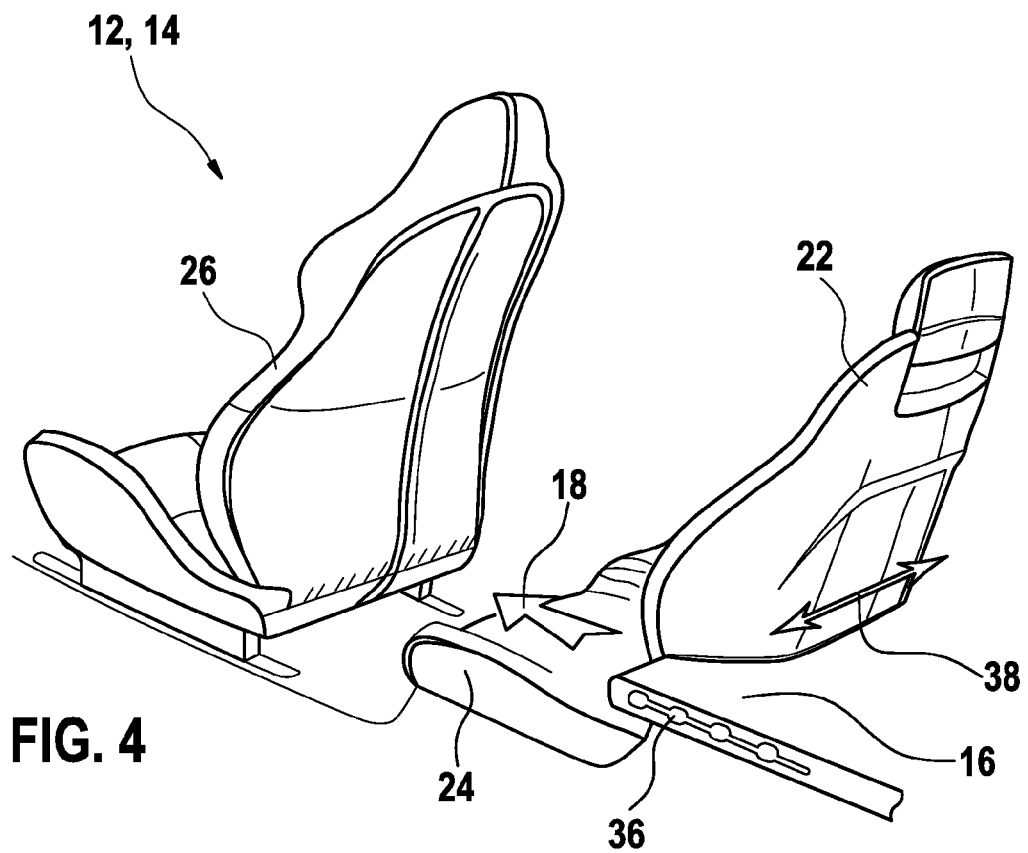
FIG. 4 shows a schematic perspective view of the loading base arrangement from FIG. 3.

The loading base 16 may, for example, have laterally attached guide elements 36, with the aid of which the loading base 16 can be guided in a rail or the like (FIG. 4). Furthermore, the back rest 22 may be connected to the loading base 16 so as to be displaceable transversely to the direction of travel along an arrow 38 to allow the ergonomically shell-shaped back rest 22 to fit closely against the front seat 26 in the extended state.

Figure 5:
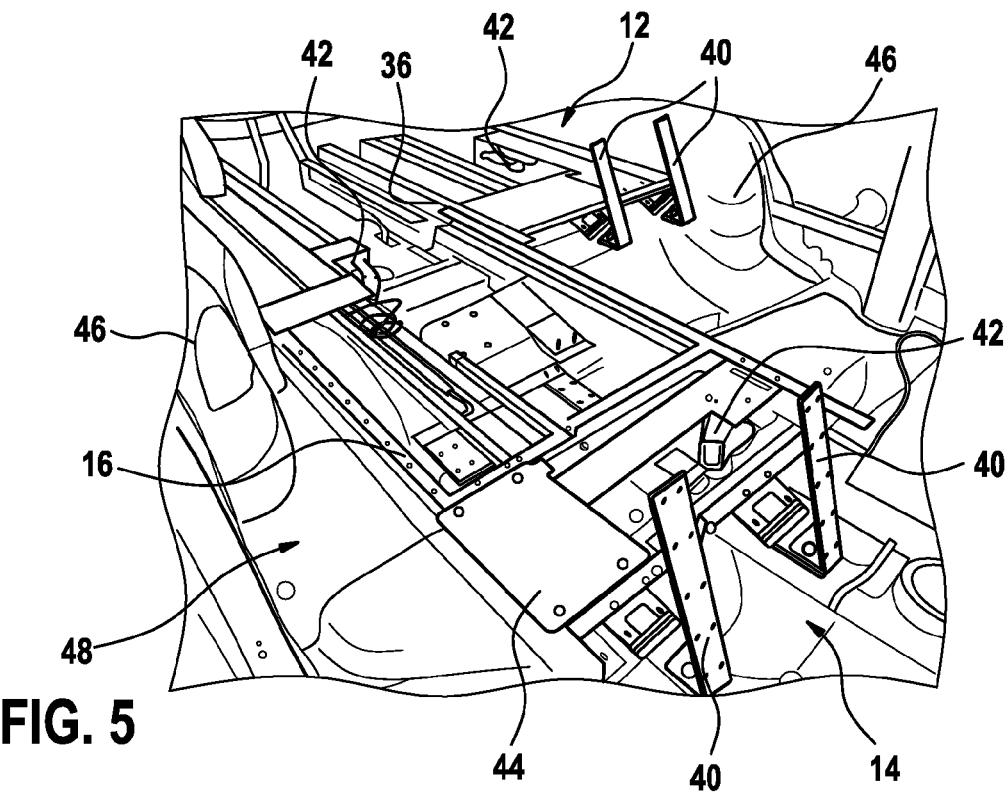
FIG. 5 shows a perspective view of the extended loading base arrangement in a first position and FIG. 6 shows a perspective view of the loading base arrangement FIG. 5 in a second position.
Figure 6:
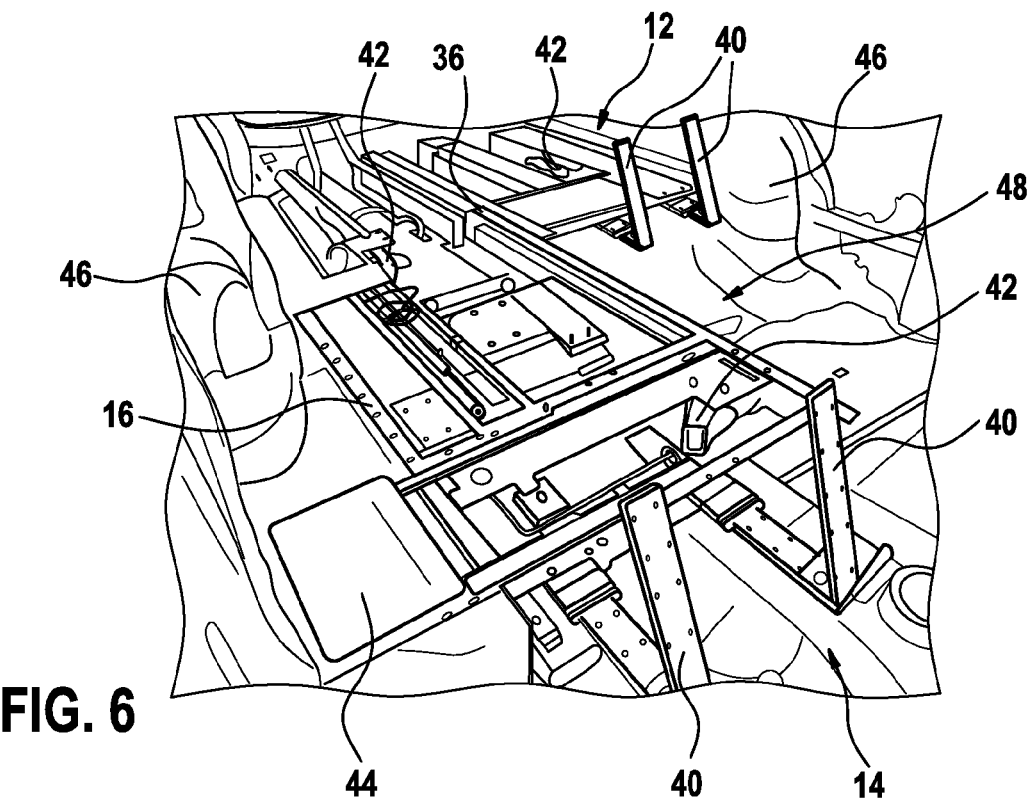

A sub-construction for the loading base arrangement 12, 14 is shown in FIG. 5 and 6. The base element 16 is shown here without a depositing area so as to be able to show the inner workings of the base element 16 better. The base element 16, in the front region, has angle brackets 40, on which the back rest 22 can be fastened in each case. The loading base arrangement 12, 14 has various actuating devices 42 to move the loading base 16 or components connected to the loading base. The base element 16 also has a laterally extendable supplementary base 44, which, when retracted (FIG. 5), can be moved past a wheel housing 46 of a motor vehicle body 48 with the aid of the loading base 16 and then extended in front of the wheel housing 46 (FIG. 6). It is thus possible, at a relatively low height, to also use the space region between the wheel housing 46 and the front seat 26 as a loading space with a substantially level loading area.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A loading base arrangement for a motor vehicle comprising:

a base element, which can be moved in a direction of travel, for depositing items, the base element having a laterally extendable supplementary base; and a rear seat, which has a back rest and a seat cushion;

wherein the back rest is connected to the base element, and, when extended, the base element at least partially covers the seat cushion.

2. The loading base arrangement according to claim 1, wherein the back rest, in a maximally extended state, at least contacts a front seat.

3. The loading base arrangement according to claim 1, wherein, in a maximally extended state, the seat cushion is completely covered by the base element.

4. The loading base arrangement according to claim 1, wherein at least one actuating device is provided to move the base element relative to move the back rest.

5. A loading base arrangement for a motor vehicle comprising:
- a base element, which can be moved in a direction of travel, for depositing items; and
- a rear seat, which has a back rest and a seat cushion;
- wherein the back rest is connected to the base element so as to be movable transversely to the direction of travel, and, when extended, the base element at least partially covers the seat cushion.

6. A loading base arrangement for a motor vehicle comprising:
- a base element, which can be moved in a direction of travel, for depositing items;
- a rear seat, which has a back rest and a seat cushion; and
- a height-adjustable additional base forming a substantially level loading area with the base element;
- wherein the back rest is connected to the base element, and, when extended, the base element at least partially covers the seat cushion.

7. The loading base arrangement according to claim 6 wherein the additional base appears when the base element is moved into an extended position.

8. The loading base arrangement according to claim 6 wherein the base element has a first slanting side region, and wherein the additional base has a second slanting side region.

9. The loading base arrangement according to claim 8 wherein the first slanting side region contacts the second slanting side region as the additional base is moved upward to urge the base element toward an extended position.

10. The loading base arrangement according to claim 6 wherein the height-adjustable additional base is configured to be moved along a first axis when the height of the height-adjustable additional base is adjusted, and wherein the base element is configured to be moved along a second axis when moved in the direction of travel, the second axis being substantially perpendicular to the first axis.

11. A loading base arrangement for a motor vehicle comprising:
- a base element, which can be moved in a direction of travel, for depositing items; and
- a rear seat, which has a back rest and a seat cushion;
- wherein the back rest is connected to the base element, and, when extended, the base element at least partially covers the seat cushion; and
- wherein the base element can be locked in the retracted state by a locking device.

12. The loading base arrangement according to claim 11 further comprising a front seat, the back rest of the rear seat moving toward or away from the front seat as the base element is moved in the direction of the travel.

13. The loading base arrangement according to claim 12 wherein a front portion of the back rest of the rear seat resides adjacent a rear portion of the front seat when the back rest of the rear seat is moved into a fully extended position.

14. The loading base arrangement according to claim 11 further comprising a guide rail mounted to the base element and configured to guide the movement thereof.

15. The loading base arrangement according to claim 11 further comprising an angle bracket coupled between the back rest of the rear seat and the base element.

* * * * *